US009819186B2

(12) United States Patent
Rogers, Jr. et al.

(10) Patent No.: US 9,819,186 B2
(45) Date of Patent: Nov. 14, 2017

(54) AUTOMATED DEMAND RESPONSE SYSTEM AND METHOD

(71) Applicant: Electric Power Systems, Inc., Anchorage, AK (US)

(72) Inventors: Daniel C. Rogers, Jr., Anchorage, AK (US); Alexander H. Hills, Palmer, AK (US)

(73) Assignee: ELECTRIC POWER SYSTEMS, INC., Anchorage, AK (US)

( * ) Notice: Subject to any disclaimer, the term of this patent is extended or adjusted under 35 U.S.C. 154(b) by 140 days.

(21) Appl. No.: 14/595,958

(22) Filed: Jan. 13, 2015

(65) Prior Publication Data

US 2016/0204607 A1    Jul. 14, 2016

(51) Int. Cl.
| | |
|---|---|
| H05B 37/02 | (2006.01) |
| H05B 39/04 | (2006.01) |
| H05B 41/36 | (2006.01) |
| H02J 3/14 | (2006.01) |
| H02J 7/00 | (2006.01) |

(52) U.S. Cl.
CPC .............. *H02J 3/14* (2013.01); *H02J 7/007* (2013.01); *H05B 37/0218* (2013.01); *Y02B 20/46* (2013.01)

(58) Field of Classification Search
None
See application file for complete search history.

(56) References Cited

U.S. PATENT DOCUMENTS

| | | |
|---|---|---|
| 5,168,170 A | 12/1992 | Hartig |
| 5,502,339 A | 3/1996 | Hartig |
| 7,830,037 B2 | 11/2010 | Hirst |
| 8,143,842 B2 | 3/2012 | Tyler |

(Continued)

FOREIGN PATENT DOCUMENTS

EP    0 750 383 A1    12/1996

OTHER PUBLICATIONS

"Advanced Metering Infrastructure: NETL Modern Grid Strategy Powering Our 21st-Century Economy," Version 1.0, National Energy Technology Laboratory for the U.S. Department of Energy, Office of Electricity Delivery and Energy Reliability, Feb. 2008, 34 pages.

(Continued)

*Primary Examiner* — Anh Tran
(74) *Attorney, Agent, or Firm* — Christensen O'Connor Johnson; Matthew Balint

(57) ABSTRACT

A system and method for controlling power transfer between a power grid and at least one load. In at least one embodiment, the system includes a controller having a power regulator. The controller obtains grid data related to the power grid. The power regulator of the controller enables or disables and/or increases or decreases the power transfer between the power grid and a first load based at least in part on the obtained grid data and data relating to a power requirement of the first load. The power regulator may be coupled in line between an electric panel connected to the power grid and the first load. The controller may be coupled to the first load through a wiring system of a building. Multiple controllers may be coupled respectively to multiple loads, wherein each controller is configured to control a power transfer between the power grid and a respective load.

3 Claims, 8 Drawing Sheets

(56) References Cited

U.S. PATENT DOCUMENTS

| | | | |
|---|---|---|---|
| 8,177,139 B2 | 5/2012 | Mueller | |
| 8,204,633 B2 | 6/2012 | Harbin, III | |
| 8,478,452 B2 | 7/2013 | Pratt | |
| 8,768,526 B2 | 7/2014 | Harbin, III | |
| 2011/0001438 A1* | 1/2011 | Chemel | H05B 37/029 315/297 |
| 2012/0233045 A1* | 9/2012 | Verfuerth | H05B 37/0272 705/34 |
| 2012/0299485 A1* | 11/2012 | Mohan | H05B 37/0218 315/153 |
| 2013/0033234 A1 | 2/2013 | Koritarov | |

OTHER PUBLICATIONS

Ahn, C., et al.,"Decentralized Charging Algorithm for Electrified Vehicles Connected to Smart Grid," American Control Conference (ACC), Jun. 29-Jul. 1, 2011, San Francisco, pp. 3924-3929.

Ahn, C., et al.,"Optimal Decentralized Charging Control Algorithm for Electrified Vehicles Connected to Smart Grid," Journal of Power Sources 196(23):10369-10379, Dec. 2011.

"Aquanta. Cool Technology for Hot Water," Sunnovations, Nov. 25, 2014, Kickstarter Campaign, <https://www.kickstarter.com/projects/651800236/aquanta-cool-technology-for-hot-water>, 17 pages.

Bohn, T., and H. Chaudhry, "Overview of SAE Standards for Plug-In Electric Vehicle," IEEE PES Innovative Smart Grid Technologies (ISGT), D.C., Jan. 16-20, 2012, 19 pages.

Brown, M., "The Aquanta Smart Water-Heater Controller Promises to Slash Your Energy Bill," TechHive, Nov. 20, 2014, <http://www.techhive.com/article/2849816/the-aquanta-smart-water-heater-controller-promises-to-slash-your-energy-bill.html>, 5 pages.

Callaway, D.S., and I.A. Hiskens, "Achieving Controllability of Electric Loads," Proceedings of the IEEE 99(1): 184-199, Jan. 2011.

Fan, Z., "Distributed Charging of PHEVs in a Smart Grid," IEEE International Conference on Smart Grid Communications (SmartGridComm),Brussels, Oct. 17-20, 2011, pp. 255-260.

Gellings, C.W., "Demand Response," EPRI: Electric Power Research Institute, Palo Alto, Calif., Mar. 2, 2011, CWG/9366P, 57 pages.

Gharesifard, B., et al., "Price-Based Distributed Control for Networked Plug-In Electric Vehicles," American Control Conference (ACC), D.C., Jun. 17-19, 2013, pp. 5086-5091.

Li, C.-T., et al., "Decentralized Charging of Plug-In Electric Vehicles," Proceedings of the ASME Dynamic Systems and Control Conference and Bath/ASME Symposium on Fluid, Power and Motion Control, Arlington, Va., Nov. 2, 2011, vol. 2, pp. 247-254.

"Load Management," Wikipedia, <http://en.wikipedia.org/wiki/Load_management>, available at least as early as Aug. 29, 2007.

Ma, Z., et al., "Optimal Charging Control for Plug-In Electric Vehicles," Control and Optimization Methods for Electric Smart Grids: Power Electronics and Power Systems, Springer, New York, vol. 3, pp. 259-273.

Mathieu, J.L., et al., "Using Residential Electric Loads for Fast Demand Response: The Potential Resource and Revenues, the Costs, and Policy Recommendations," ACEEE Summer Study on Energy Efficiency in Buildings, University of California, Berkeley, 2012, pp. 1-189-1-203.

Sánchez-Martín, P., et al., "Direct Load Control Decision Model for Aggregated EV Charging Points," IEEE Transactions on Power Systems 27(3):1577-1584, Aug. 2012.

Sinitsyn, N. A., et al., "Safe Protocols for Generating Power Pulses With Heterogeneous Populations of Thermostatically Controlled Loads," Energy Conversion and Management 67:297-308, Mar. 2013.

"'Smart' Frequency-Sensing Charge Controller for Electric Vehicles," Argonne National Laboratory, U.S. Department of Energy, Dec. 2012, tsd_IN10049_1212_mn, 2 pages.

"Smart Grid," Wikipedia, <http://en.wikipedia.org/wiki/Smart_grid>, available at least as early as Sep. 10, 2007.

"The Smart Grid: An Introduction," U.S. Department of Energy by Litos Strategic Communication, Under Contract No. DE-AC26-04NT41817, Subtask 560.01.04, 2008, 48 pages.

St. John, J., "The Water Heater as Grid Battery, Version 2.0," Greentech Media, Nov. 8, 2013, <http://www.greentechmedia.com/articles/read/the-water-heater-as-grid-battery-version-2.0>, 11 pages.

St. John, J., "The Water-Heater-to-Smart-Grid Connector Goes Commercial," Greentech Media, Jul. 12, 2013, <http://www.greentechmedia.com/articles/read/the-water-heater-to-smart-grid-connector-goes-commercial>, 5 pages.

Takebayashi, T., et al., "Power Supply and Demand Control Technologies for Smart Cities," Fujitsu Scientific & Technical Journal 50(1):72-77, Jan. 2014.

"Wiser™ Home Management," Schneider Electric, Palatine, Ill., Document No. 0100BR1004R01/14, Jan. 2014, 12-page brochure.

Zhao, C., et al., "Frequency-Based Load Control in Power Systems" American Control Conference (ACC), Montreal, Jun. 27-29, 2012, pp. 4423-4430.

* cited by examiner

AUTOMATED DEMAND RESPONSE SYSTEM AND METHOD

BACKGROUND

Electrical utilities use various techniques to balance, match, and store excess electric power during periods of low demand for use during periods of high demand. When the load on a system approaches the supply, the utility typically must either find additional supplies of energy or find ways to curtail the load. It can be difficult to store electric energy in bulk.

Obtaining power during periods of peak demand can be costly. Some utilities must rely on high cost "peaking" generators when demand for electric power exceeds supply. Another option is to decrease or shift loads rather than increasing or shifting supply. Shifting demand is difficult for utilities to accomplish because the magnitude of the loads put on the power delivery system of the utility is controlled by customers rather than the power supplier.

The smart power grid ("smart grid") is believed to have infrastructure that will better provide for load shifting. The smart grid is currently being implemented. Smart grid developers anticipate that in the future individual electric appliances will be manufactured to include built-in functionality that allows the appliances to receive smart grid communications from utilities, initiate actions to reduce or stop power consumption, and send messages back to the utilities indicating states of appliances and what actions have been taken. It is expected that there will be a transition period spanning many years because compatibility with the smart grid will require consumers to replace their existing appliances with new appliances that are compatible with smart grid technology. It is believed that substantial time will be required before the utilities will be able to take advantages of the smart grid.

What is needed is a device that will allow loads without built-in smart grid technology to interact with the smart grid.

SUMMARY

The following summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present application provides a system for controlling power transfer between a power grid and at least one load at premises of a user of the power grid. The system includes a first controller having a storage and a first power regulator that is configured to be couplable between a first load and an electric panel that is coupled to the power grid. The storage of the first controller contains data relating to one or more power requirements of the first load. The first controller is configured to obtain grid data relating to a dynamic characteristic of the power grid and cause the power regulator to regulate the power transfer between the power grid and the first load based at least in part on the obtained grid data and data retrieved from the storage of the first controller relating to a power requirement of the first load.

In certain embodiments, the first controller is further configured to obtain load data relating to a dynamic characteristic of the first load and/or the surroundings of the first load, and cause the first power regulator to regulate the power transfer between the power grid and the first load based on the obtained grid data, the obtained load data, and the data retrieved from the storage of the first controller. The first controller may be configured to receive the load data from the first load.

In one or more embodiments, the first load includes a control device, and the first controller is further configured to transmit a signal to the control device of the first load based at least in part on the obtained grid data and data retrieved from the storage relating to a power requirement of the first load. The control device of the first load may be configured to regulate the power transfer between the power grid and the first load in response to the transmitted signal.

In certain embodiments, the first controller may be configured to be couplable to a wiring system of a building such that the first load is coupled to the power grid through the power regulator and the wiring system of the building.

In certain embodiments the obtained grid data includes at least one of a first price value indicative of a current price of power provided by the power grid, a second price value indicative of a price of power provided by the power grid at a corresponding time or date, a frequency value of electric power provided by the power grid, and an overall load value indicative of an overall load level on the power grid. In certain embodiments, the obtained load data includes a load shift request that indicates a request to enable or disable and/or increase or decrease the load on the power grid.

In certain embodiments, the data relating to one or more power requirements of the first load includes a plurality of parameters. The first controller may be further configured to retrieve a parameter from the storage corresponding to the obtained grid data, compare the retrieved parameter to the obtained grid data, and cause the power regulator to regulate the power transfer between the power grid and the first load based at least in part on the comparison. The first controller may be further configured to modify the data relating to one or more power requirements of the first load in response to one or more user-supplied inputs.

In one or more embodiments, the first controller is further coupled to a sensor that senses the dynamic characteristic of at least one of the first load and/or the surroundings of the first load, and the first controller obtains the load data from the sensor. The sensor may be a temperature sensor configured to sense a temperature of the first load. The first controller may be further configured to obtain a temperature value of the first load from the temperature sensor, retrieve data from the storage relating to a specified temperature of the first load, compare the obtained temperature value with the retrieved data, and cause the power regulator to regulate the power transfer between the power grid and the first load based at least in part on the comparison.

In one or more embodiments, the data retrieved from the storage relates to a specified temperature of the first load at a specified time or date, and wherein the first controller is further configured to determine a current time or date, compare the obtained temperature value and the current time or date with the retrieved data and the specified time or date, and cause the power regulator to regulate the power transfer between the power grid and the first load based at least in part on the comparison.

In one or more embodiments, the first load is a lighting system at premises of the user. The sensor may be a light sensor configured to sense an intensity of light provided by the lighting system. The first controller may be further configured to obtain a value of the intensity of light from the light sensor, retrieve data from the storage relating to a specified value of intensity of light for premises of the user, compare the obtained value of the intensity of light with the retrieved data, and cause the power regulator to regulate the power transfer between the power grid and the lighting system based at least in part on the comparison.

In one or more embodiments, the data retrieved from the storage relates to a specified value of intensity of light at a specified time or date. The first controller may be further configured to determine a current time or date, compare the obtained value of the intensity of light and the current time or date with the retrieved data and the specified time or date, and cause the power regulator to regulate the power transfer between the power grid and the lighting system based at least in part on the comparison.

In certain embodiments, the first load comprises an electric vehicle or other equipment having an energy storage device. The first controller is further configured to receive a signal that is indicative of a relative state of charge of the energy storage device and cause the power regulator to regulate the power transfer between the power grid and the energy storage device based at least in part on the obtained grid data and the received signal indicative of the relative state of charge of the energy storage device.

In certain embodiments, the first controller may be configured to cause power to transfer from the energy storage device of the electric vehicle or the other equipment having an energy storage device to the power grid in which the user receives a credit for the power transferred to the power grid.

In one or more embodiments, the obtained grid data includes at least one of a first price value indicative of a current price of power provided by the power grid or a second price value indicative of a price of power provided by the power grid at a corresponding time or date.

In one or more embodiments, the data retrieved from the storage relating to a power requirement of the first load may include a specified relative state of charge for the energy storage device at a specified time or day. The first controller may be further configured to cause the power regulator to regulate the power transfer between the power grid and the energy storage device based at least in part on the obtained grid data and the received signal indicative of the relative state of charge of the energy storage device such that the energy storage device has at least the specified relative state of charge at the specified time or date.

In one or more embodiments, the system includes an interface coupled to the first controller. The interface may be configured to receive a user-supplied input specifying at least one of the relative state of charge or the time or date for the energy storage device to have the specified relative state of charge.

In one or more embodiments, the system further includes a second controller having a storage and a power regulator that is configured to be couplable between a second load and the electric panel. The storage of the second controller contains data relating to one or more power requirements of the second load. The second controller may be configured to obtain grid data relating to a dynamic characteristic of the power grid, obtain load data relating to a dynamic characteristic of the second load, and cause the power regulator of the second controller to regulate the power transfer between the power grid and the second load based at least in part on the obtained grid data, the obtained load relating to the dynamic characteristic of the second load, and data retrieved from the storage relating to a power requirement of the second load.

In one or more embodiments, the first controller is further configured to transmit data to a power delivery system of the power grid based at least in part on one or more of the obtained grid data, the obtained load data relating to a dynamic characteristic of the second load, and data retrieved from the storage of the second controller relating to a power requirement of the second load.

In one or more embodiments, the second controller is further configured to obtain grid data relating to a dynamic characteristic of the power grid that has been modified based on the data transmitted to the power delivery system of the power grid by the first controller.

In certain embodiments, the data transmitted to the power delivery system of the power grid by the first load indicates a current or future increase or decrease in power transfer between the power grid and the first load.

In certain embodiments, the first controller is configured to receive the grid data from a smart meter and/or transmit data to the smart meter.

In another aspect, the present application further provides a method for controlling power transfer between a power grid and at least one load at premises of a user of the power grid. The method includes obtaining grid data relating to a dynamic characteristic of the power grid, retrieving data from a storage, wherein the data relates to one or more power requirements of a first load, and causing a first power regulator connected in a first circuit between the first load and an electric panel that is coupled to the power grid to regulate the power transfer between the power grid and the first load based at least in part on the obtained grid data and the retrieved data relating to a power requirement of the first load. The grid data may include at least one of a first price value indicative of a current price of power provided by the power grid, a second price value indicative a price of power provided by the power grid at a corresponding time or date, a frequency value of electric power provided by the power grid, an overall load value indicative of an overall load level on the power grid, or a load shift request that indicates a request to enable or disable and/or increase or decrease the load on the power grid.

In one or more embodiments, the method further includes obtaining load data relating to a dynamic characteristic of the first load, and causing the first power regulator to regulate the power transfer between the power grid and the first load based on the obtained grid data, the obtained load data relating to the dynamic characteristic of the first load, and the data retrieved from the storage.

In certain embodiments, the data relating to one or more power requirements of the first load includes a plurality of parameters, and the method also includes retrieving a parameter from the storage corresponding to the obtained grid data, comparing the retrieved parameter to the obtained grid data, and causing the first power regulator to regulate the power transfer between the power grid and the first load based at least in part on the comparison.

In one or more embodiments, the method further includes at least one of sensing a temperature of the first load using a temperature sensor and comparing the sensed temperature with a specified temperature of the first load; sensing a value of intensity of light from the first load and comparing the sensed value with a specified value of intensity of light; or sensing a relative state of charge of the first load and comparing the sensed relative state of charge with a specified relative state of charge. The method may further include causing the first power regulator to regulate the power transfer between the power grid and the first load further based at least in part on the comparison.

In one or more embodiments, the method may further include coupling the first power regulator to a wiring system of a building such that the first load is coupled to the power grid through the first power regulator and the wiring system of the building.

In certain embodiments, the wiring system of the building may include a general purpose power outlet and the method further includes coupling the first power regulator to the power outlet.

In certain embodiments, the method further includes retrieving data from the storage, obtaining load data relating to a dynamic characteristic of the second load, and causing a second power regulator that is connected in a second circuit between the second load and the electric panel to regulate the power transfer between the power grid and the second load based at least in part on the obtained grid data, the obtained load data relating to the dynamic characteristic of the second load, and the retrieved data relating to a power requirement of the second load. The data retrieved from storage relates to one or more power requirements of a second load. The second circuit and the first circuit may be distinct from one another.

In yet another aspect, the present application further provides a system for controlling power transfer between a power grid and at least one load at the premises of a user of the power grid, the system comprising a first controller, a second controller that includes a power regulator that is configured to be couplable between a first load and an electric panel that is coupled to the power grid, and a third controller that includes a power regulator that is configured to be couplable between a second load and the electric panel. The first controller includes a storage that contains data relating to one or more power requirements of the first load and the second load. The first controller is communicatively coupled to the second and third controllers. The first controller is configured to obtain grid data relating to a dynamic characteristic of the power grid, obtain load data relating to a dynamic characteristic of the first load and the second load, transmit a signal to the second controller that causes the power regulator of the second controller to regulate the power transfer between the power grid and the first load based at least in part on the obtained grid data, the obtained load data relating to the dynamic characteristic of the first load, and data retrieved from the storage relating to a power requirement of the first load. The first controller is further configured to transmit a signal to the third controller that causes the power regulator of the third controller to regulate the power transfer between the power grid and the second load based at least in part on the obtained grid data, the obtained load relating to the dynamic characteristic of the second load, and data retrieved from the storage relating to a power requirement of the second load.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description set forth below, in connection with the appended drawings where like numerals reference like elements, should describe various embodiments of the disclosed subject matter and is not intended to represent the only embodiments of the present disclosure. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion provides examples of systems and methods that relate to regulating the power consumed or supplied by users of a power grid. A representative device may provide for controlling energy transfer between a power grid and at least one load at the premises of a consumer. The device may be used to shift loads during periods of high demand (e.g., high air-conditioner activity during periods of hot weather) or constrained supply (e.g., slack wind where wind is a significant source of energy).

Figure 1:
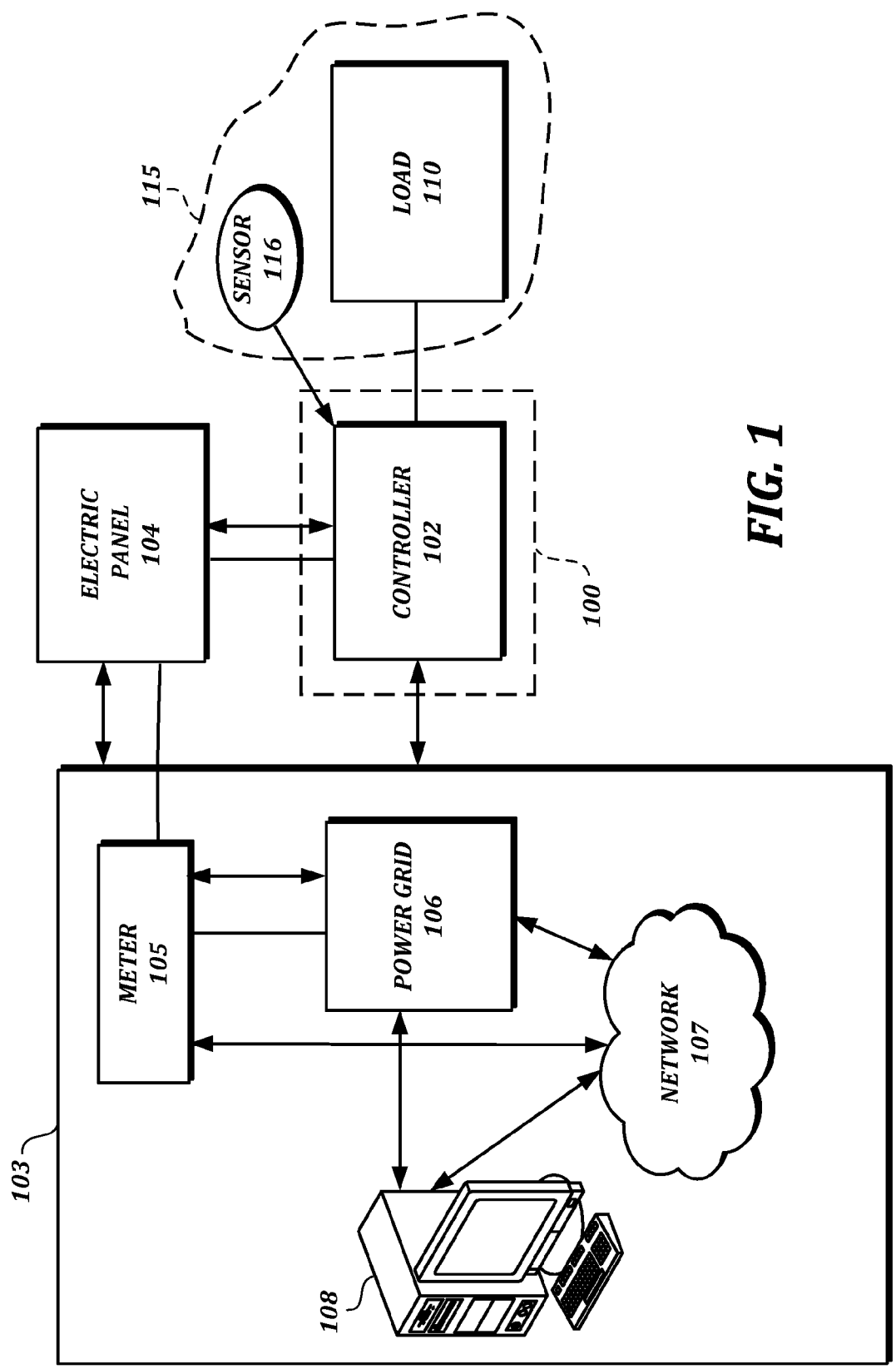
FIG. 1 is a block diagram of a control system that includes a controller communicatively coupled to a power delivery system and connected in line with a circuit connected to an electrical load at premises of a customer in accordance with one or more embodiments of the present disclosure.

FIG. 1 illustrates a control system 100 that includes a controller 102. The controller 102 may be connected in line with a circuit emanating from an electric panel 104. In one or more embodiments, the controller 102 is further connected between an energy source, such as a battery or solar panel (not shown), and the electric panel 104. In one or more embodiments, the controller 102 is further connected to a load 110. For example, the controller 102 may be connected in series with the "hot" (typically black) wire in a 110 V AC circuit or in series with two "hot" leads (typically black and red) in a 220 V AC circuit. The electric panel 104 may be electrically connected to the power grid 106 through the electric meter 105 via a drop wire. One or more 220 V AC (double circuit breaker) circuits or one or more 110 V AC (single circuit breaker) circuits may emanate from the electric panel 104.

The load 110 may include a variety of loads, such as thermostatically controlled loads (e.g., water heaters and air conditioners), electric appliances, plug-in electric vehicles, lighting, or other systems. In some embodiments, the load 110 is a "smart load" such as a "smart appliance." In one or more embodiments, the load 110 includes a control device capable of regulating the power consumption of the load in response to one or more signals received from the controller 102.

In some embodiments, the control system 100 includes a plurality of controllers 102 each connected in line with a different circuit that includes a different load. The plurality of controllers 102 may be physically separate from one another. Each of the controllers may be configured differently depending on the load. The control system 100 and the load 110 may be located at or around the premises of a user of the power grid 106. Users of the power grid 106 may include consumers of power from the power grid 106 or suppliers of power to the power grid 106.

A power delivery system 103 includes elements such as the meter 105 and the power grid 106. The power delivery system 103 may be associated with or operated by at least one power supplier. The power supplier may include a traditional public or private power utility or a non-traditional provider of power. For example, the power supplier may include a utility organization, an affiliate utility, a power aggregator, an independent supplier of power, or a group of power users who have come together to independently generate and/or distribute electric power.

The power grid 106 (also referred to as an "electric grid") includes any currently known or later developed system for delivering or providing electricity to one or more consumers and receiving electricity from one or more suppliers. The power grid 106 may include traditional network components, such as wires, substations, transformers, switches, and "smart grid" components such that at least a portion of the power grid is considered a "smart grid." For example, the power grid 106 may include sensors (e.g., power meters, voltage sensors, fault detectors, etc.) for gathering data. In one or more embodiments, the power grid 106 includes components of a traditional power supplier. In at least one embodiment, the power grid 106 includes one or more microgrids. A microgrid may be a local electric grid for the generation and distribution of electrical power that, from time to time, may be connected or disconnected from a larger power grid.

In one or more embodiments, the electric meter 105 is a "smart" electric meter. Smart electric meters are increasingly being used by electric utilities. Smart electric meters may conform to industry standards, such as AMI, for example, and may be located at or around the premises of a user of the power grid 106.

The power delivery system 103 may further include a power delivery computer 108. The power delivery computer 108 may include a computer, computer system, server, or the like, that is communicatively coupled to the controller 102. For example, the power delivery computer 108 may be communicatively coupled to the controller 102 through the power grid 106 or the communications network 107. In one or more embodiments, the power delivery computer 108 is communicatively coupled to the controller 102 through the electric meter 105. In one or more embodiments, the controller 102 is not communicatively coupled to the electric meter 105.

The controller 102, the power grid 106, the communications network 107, and the power delivery computer 108 may include suitable communications electronics for providing one- or two-way communication with one another to enable communication between the power delivery system 103 and the controller 102. Communication between the power delivery system 103 and the controller 102 may be via direct or indirect, wired or wireless connections or combinations thereof. In one or more embodiments, power line carrier technology may be used.

Example protocols for receiving and sending signals between the controller 102, the electric meter 105, the power grid 106, the communications network 107, and/or the power delivery computer 108 may include those used for Internet communication, e.g., TCP, IP, UDP, or protocols developed by ANSI, IEEE, or Open Automated Demand Response (OpenADR). Further, IEEE 802.3, IEEE 802.5, or other known or later developed protocols may be used with wired links, for example. Wireless communication may be implemented using 2G, 3G, 4G, 4G LTE or any other cellular protocol or technology, or by using IEEE 802.11 (Wi-Fi), Bluetooth, Zigbee, or other known or later developed protocols.

In one or more embodiments, the electric panel 104 comprises a distribution board that divides an electric power feed from the power grid 106 into subsidiary circuits. The electric panel 104 may include one or more fuses or circuit breakers coupled to one or more of the subsidiary circuits. A controller may be miniaturized so it is integrated into a circuit breaker that can be installed in the electric panel 104. In some embodiments, the controller 102 can be included within the electric panel 104. Alternatively, the controller 102 may be positioned adjacent to the electric panel 104.

The power delivery computer 108 or the electric meter 105 may be configured to determine or obtain grid data. The power delivery computer 108 or the electric meter 105 may be configured to transmit the grid data to the controller 102. Such grid data may relate to one or more dynamic characteristics of the power grid 106. For example, the grid data may include, without limitation, a need or request by the power delivery system 103, an affiliated power supplier or other party to shed or shift load; a current price of energy (e.g., in cents per kWh); or a change in current price of energy (e.g., in cents per kWh). In one or more embodiments, the grid data may include a need or request by the power delivery system 103, a power supplier or other party to shed or shift load to a different time period. Grid data may include the current frequency of the power grid 106. The grid data may include an estimate for a future price of energy or a price change indicated as a multiplier of a base rate. The price of energy may be for energy provided by the power grid 106 to a user or for energy provided to the power grid 106 by a user.

The power delivery system 103 can signal its needs by dynamically changing the price of energy. For example, if the power grid 106 is experiencing high demand, the price of energy provided by the power delivery system 103 via the power grid 106 may be increased, or the price paid by the power delivery system 103 for energy provided to the power grid 106 may be increased. The price of energy may be higher during high demand periods because the cost of obtaining additional energy during those periods may be high. Operation of peaking generators may be required during high load periods to provide the additional power needed. During normal or low load conditions, the power delivery system 103 may decrease the price of energy, reflecting the lower cost of generating or obtaining power under those conditions.

Still referring to FIG. 1, in one or more embodiments, the controller 102 is configured to obtain load data. Load data may relate to one or more dynamic characteristics of the load 110 and/or its environment 115. Load data may include sensor data. Load data may be data obtained from at least one sensor 116 via wired or wireless communication. The sensor 116 may be located at or adjacent to the load 110. Load data may include data from a temperature sensor, a light sensor, a motion sensor, chemical sensor, a pressure sensor, a sound sensor, a proximity sensor, or a flow sensor. Load data may be communicated from the load 110 when the load 110 is a "smart" load. Load data may include a temperature of a refrigerator, a temperature of a freezer, a temperature of water in a tank of a hot water heater, a temperature of a room, a level of lighting at a location, a relative state of charge of an energy storage device (e.g., a battery of a plug-in electric vehicle (PEV) or other equipment), which indicates the power needs of the load 110. In one or more embodiments, load data may include data from a thermostat.

Figure 6:
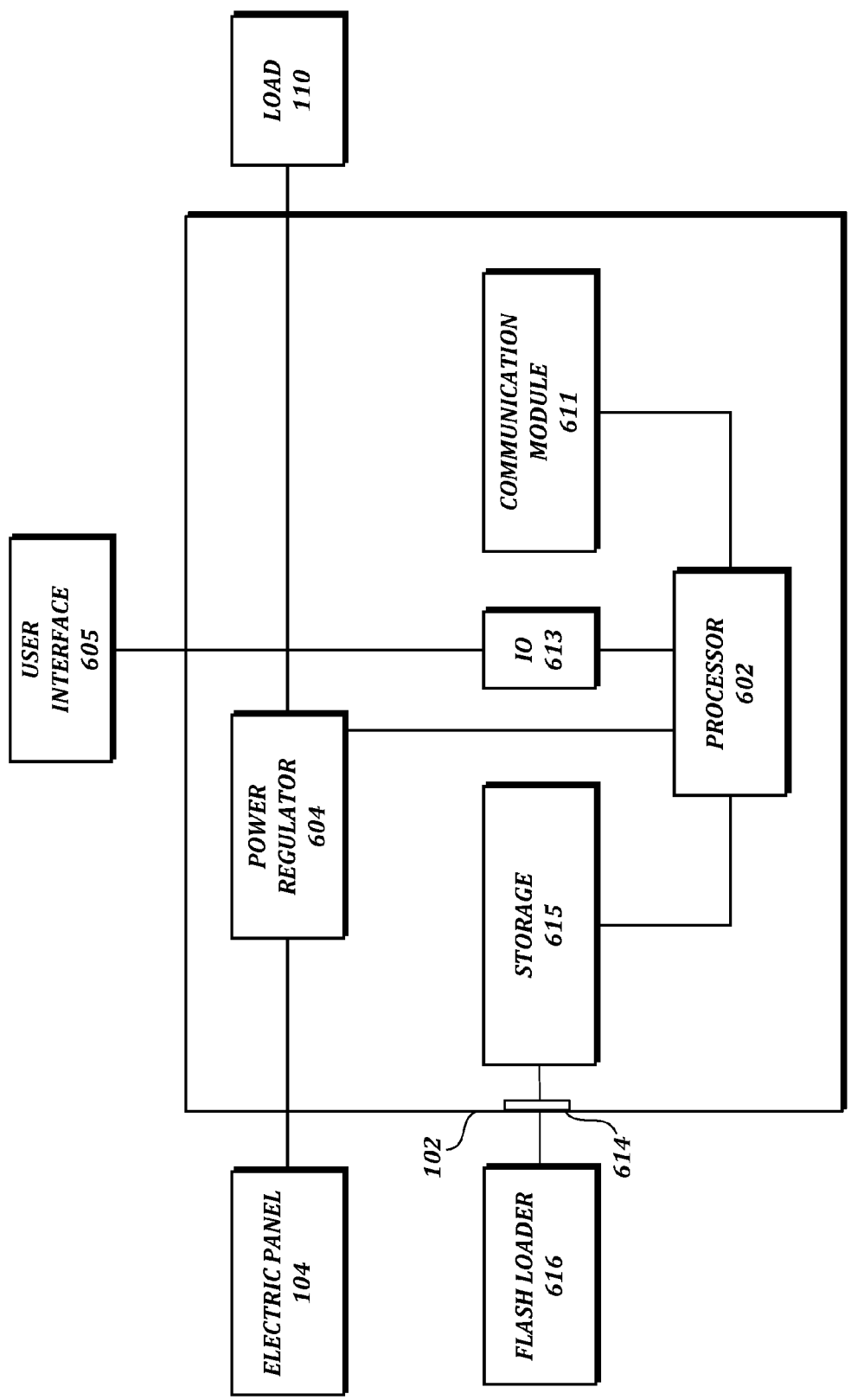
FIG. 6 is a block diagram of a controller in accordance with one or more embodiments of the present disclosure.

Referring now to FIG. 6, a block diagram of the controller 102 is provided. The controller 102 in this embodiment includes a processor 602, communication module 611, an IO module 613, and a storage 615. The storage 615 may include Flash memory or Random Access Memory (RAM). In one or more embodiments, the storage 615 contains data related to one or more power requirements of the load 110. The power requirements for the load 110 may be set by the user or may be pre-set. For example, power requirements for the load may include times or dates that a certain threshold condition should be met or achieved. If the load is a lighting system located in a room, the power requirements for the load may include threshold levels of light in the room. The threshold levels of light in the room may be higher when the room is occupied. At times that the room is unoccupied, the power requirements for the load may be lower or none.

The values of the data related to a power requirement of a load, such as the load 110 may be set in various ways. The data related to a power requirement of the load may be set prior to purchase or downloaded from a server affiliated with the power delivery system 103. In some embodiments, the power requirement data may be modified by a user input. The power requirement data may be set by a user based on preferences of the user. The data related to a power requirement of the load may be stored in the controller 102 as a look-up table or a formula. The data related to a power requirement of the load may correspond to a date or time.

Still referring to FIG. 6, the storage 615 may include other parameters such as an upper threshold price parameter and a lower threshold price parameter that indicate a first threshold and a second threshold on a price of electricity. If the grid data includes a current price value that exceeds the first threshold, the controller 102 may act to reduce or stop the power flow to the load 110. In some embodiments, if the grid data includes a price value that is less than the second threshold, the controller 102 may cause the power consumed by the load 110 to increase. The stored parameters may include a minimum parameter (e.g., a lower threshold), or a maximum parameter (e.g., an upper threshold) to be compared with grid data to control power consumption by the load 110.

To change or adjust functionality of the controller 102, the software running on the processor 602 may be modified from time to time. For example, if the controller 102 is being used with an electric water heater, the controller 102 may require different functionality than if the controller 102 is being used with a PEV. The data in the storage 615 may be modified to change the power requirements of the load. For example, a user may want to modify software running on the controller to reduce energy consumption. The storage 615 may include storage or memory that may be modified. For example, the storage or memory that may be modified may include flash memory or other known or later developed memory or storage. The memory or storage may be accessible through a storage interface 614. The storage or memory may be reloaded with software by temporarily connecting a loader 616 through the storage interface 614, modifying the storage or memory, and then disconnecting the loader 616 so the controller 102 can then operate according to the modified software and provide the corresponding functionality. In one or more embodiments, the storage 615 includes software for different sensors, loads, or different operating modes. The particular routine and data used by the controller 102 may be determined by user selection or automatically based on the sensor data received by the controller.

The IO module 613 of the controller 102 may be coupled to a user interface 605, as shown in FIG. 6, or a display device. The user interface 605 may include a device for receiving user inputs. The user interface 605 may include a touch screen or a control panel adapted to receive inputs from a user.

As discussed above with FIG. 1 and will be discussed in more detail with FIGS. 2-5, load data (e.g. sensor data or data from smart loads) or data from other controllers may be communicated to the controller 102. Load data or data from other controllers may be received via communications module 611 or the IO module 613. In one or more embodiments, user inputs may be communicated from a device of the user to the controller 102 via the communications module 611. User inputs may be communicated to the controller 102 via a computing device of the user. User inputs may be data related to a power requirement of the load 110 or other data usable to direct the operation of the controller 102.

The controller 102 may include or may be coupled to a power regulator 604. The power regulator 604 may be controlled by the processor 602. The power regulator 604 may regulate the power or current flowing or transferred from the power grid 106 to the load 110 or from an energy source to the power grid 106. As used herein, "regulate the power transfer" and the like means enable, disable, increase, or decrease the power or current transfer. The power regulator 604 may include suitable components that allow it to perform one or more of these functions. In one or more embodiments, the power regulator 604 may be coupled in line in one or more circuits that emanate from the electric panel 104 and between the electric panel 104 and the load 110 or an energy source. The power regulator 604 may be external or internal to the controller 102. The power regulator 604 may be as simple as a relay or a solid-state switch capable of blocking or permitting current flow. In one or more embodiments, the power regulator 604 may include circuitry that regulates the current flow in the circuit between the electric panel 104 and the load 110 or the energy source. The power regulator 604 may be configured to permit only as much current to flow as designated by the processor 602. Various circuits can be used to regulate the flow of AC current. Some of these may use silicon controlled rectifier (SCR) or insulated gate bipolar transistor (IGBT) devices.

The controller 102 may be an intelligent or "smart" device with internal computing capability. This intelligence is used to decide to turn on or off and/or increase or decrease power flow to an electric load or to decide about the power that should be supplied to the load. In at least one embodiment, the intelligence is contained in software that runs on processor 602 inside the controller 102. The processor 602 may be capable of being programmed in C, C++, Ladder, assembly language, compiler language or any other suitable computer language. The controller 102 is programmed to decide based on received inputs, such as grid data, load data, or data that relates to one or more power requirements of a load. The controller 102 may be programmed to make decisions that satisfy both consumer needs, as expressed by pre-settable parameters, and power delivery system 103 needs, as expressed in grid data that the controller 102 receives from the power delivery system 103.

Referring back to FIG. 1, the controller 102 may be configured to regulate the power transfer between the power grid 106 and the load 110 based at least in part on the obtained grid data and data retrieved from storage 615 of the controller 102 relating to a power requirement of the load 110. Decreasing the power transfer may include interrupting the circuit to stop all power transfer. In one or more embodiments of the present disclosure, the controller 102 may cause the power regulator 604 to regulate the power transfer between the power grid and the load 110 based on the obtained grid data, the obtained load data, and the data retrieved from the storage.

The controller 102 may transmit data to the power delivery system that is indicative of a current or future increase or decrease of the power transfer between the controller 102 and the power grid 106. The controller 102 may transmit the data to the power delivery system 103 in response to receiving grid data from the power delivery system 103. The transmitted data may be responsive to a request to increase or decrease the load on the power grid 106 or an estimate of power transfer to the load 110. If the grid data includes a request to increase or decrease the overall load on the power grid, the data transmitted by the controller 102 may include a YES or NO to the request. In one or more embodiments, the data transmitted to the power delivery system 103 by the controller is based on at least one of obtained grid data, obtained load data relating to a dynamic characteristic of the second load, and data retrieved from the storage of the controller 102 relating to a power requirement of the load 110. In one or more embodiments, the transmitted data may include load data. The transmitted data may indicate that it is undesirable or not feasible for power transfer between the power grid 106 to the load 110 to be changed or that the power transfer may be reduced or increased at a predetermined time.

The data transmitted by the controller 102 to the power delivery system 103 may be used by the power delivery system 103 to forecast the overall load on the power grid 106. Grid data may be based on the data transmitted from the 102 controller or other controllers or devices provided with power from the power grid 106. In one or more embodiments, a plurality of controllers 102 corresponding to different users of the power grid 106 obtain grid data indicative of a change in the price of power provided by the power grid 106. The power delivery system 103 may use data transmitted from the controllers 102 of power grid users to estimate or forecast a current or future overall load on the power grid 106. In some embodiments, the power delivery system 103 modifies or generates grid data based on signals from controllers 102 of power grid users. The power delivery system 103 may then obtain additional power or it may transmit the modified or generated grid data to the controller 102 or other devices in the system. The power delivery system 103 may provide grid data that includes increased power prices or requests to decrease load until the power delivery system 103 determines that demand will be satisfied.

Figure 2:
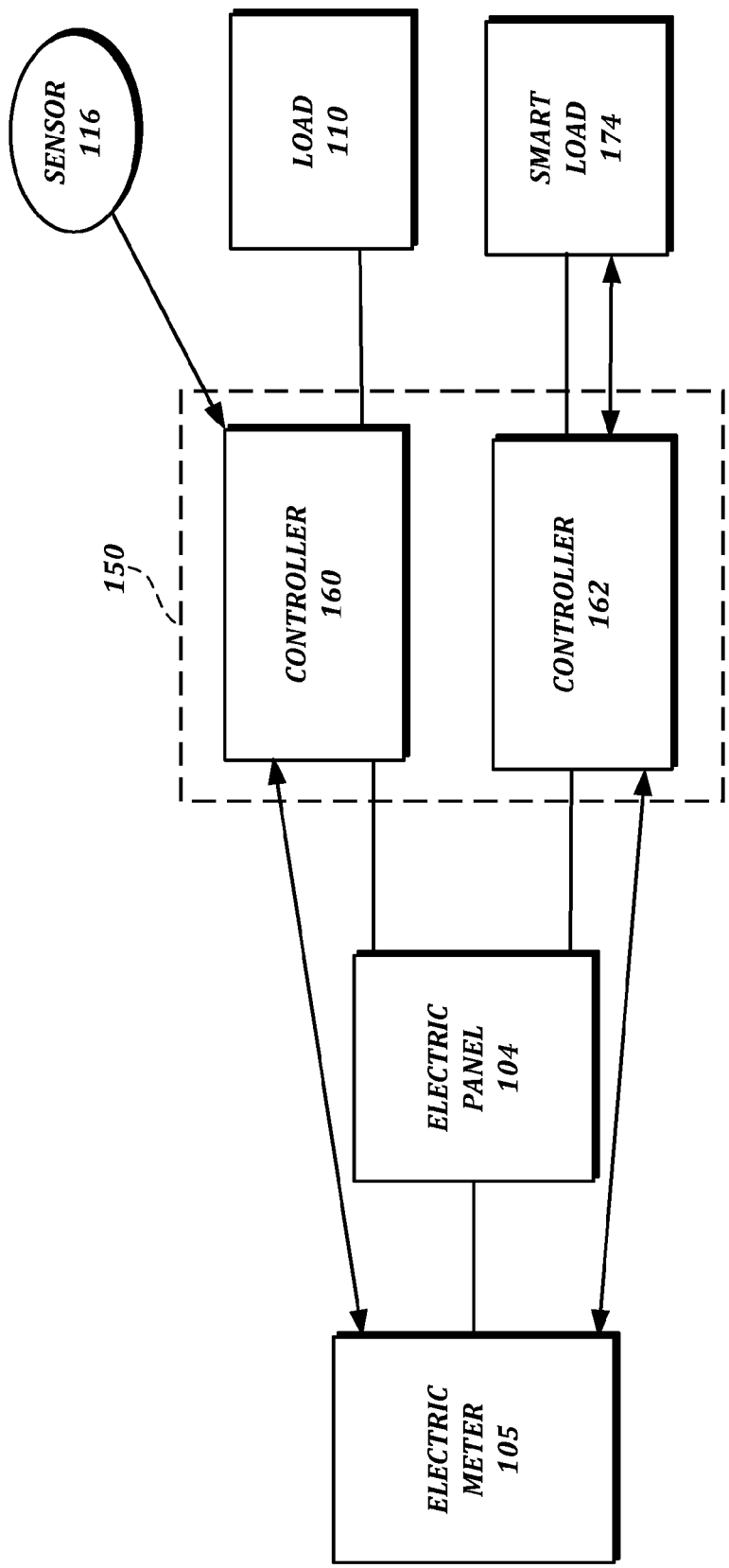
FIG. 2 is a block diagram of a control system that includes a plurality of controllers that are communicatively coupled to an electric meter and that are each connected in line with different circuits having corresponding electric loads in accordance with one or more embodiments of the present disclosure.

Referring now to FIG. 2, an embodiment of a control system 150 that includes a first controller 160 and a second controller 162 is shown. The control system 150 may be on the premises of a user. A different configuration of the controller 102 may be used for each of the first controller 160 or the second controller 162. The first controller 160 is connected in line in a first circuit emanating from the electric panel 104 between the electric panel 104 and the load 110. The second controller 162 is connected in line in a second circuit emanating from the electric panel 104 between the electric panel 104 and a smart load 174.

The electric meter 105 may include a "smart" meter, and at least one of the first controller 160 and the second controller 162 are in one- or two-way communication with the electric meter 105. The electric meter 105 communicates grid data to the first controller 160 and/or to the second controller 162. The first controller 160 or the second controller 162 may receive the grid data through a one-way wired or wireless link. The first controller 160 or the second controller 162 may receive load data from the sensor 116. The sensor 116 may be a thermometer that indicates the temperature in a room or the temperature of a particular device, e.g., an electric water heater.

The first controller 160 may be configured to cause the power regulator to regulate the power transfer between the power grid and the load 110 based on the obtained grid data, the obtained load data, and/or the data retrieved from the storage relating to a power requirement of the load 110.

The second controller 162 may be in communication with the smart load 174 that may provide load data indicative of a current state of the smart load 174 (e.g. temperature or state-of-charge). The second controller 162 and the smart load 174 may be in two-way communication. The second controller 162 may be configured to increase or decrease the power transfer between the power grid 106 and the smart load 174 by transmitting instructions to the smart load 174 based on at least one of obtained grid data, obtained load data, and/or data retrieved from storage relating to a power requirement of the smart load 174. The second controller 162 may be configured to send instructions, such as a turn off or turn on order, to the smart load 174. In some embodiments, the instructions may be more nuanced than a simple turn on/turn off order, such as an instruction for the smart load 174 to operate at an intermediate level.

Figure 3:
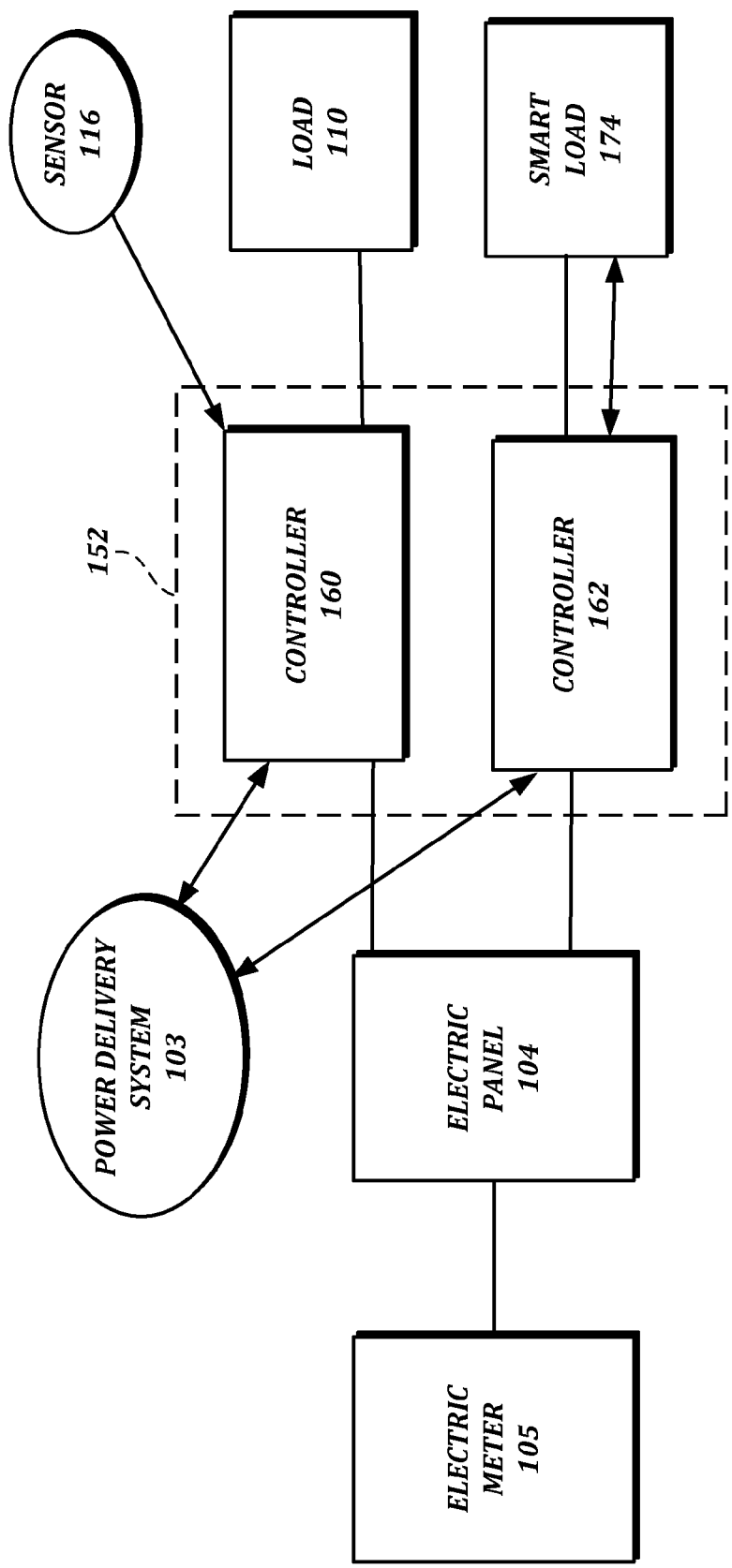
FIG. 3 is a block diagram of a control system that includes a plurality of controllers that are communicatively coupled to a power delivery system through a network or a power grid and that are each connected in line with different circuits having corresponding electric loads in accordance with one or more embodiments of the present disclosure.

FIG. 3 illustrates an embodiment of a control system 152 that includes a first controller 160 and a second controller 162. The control system 152 may be located on the premises of a user. As with the embodiment in FIG. 2, the first controller 160 is connected in line in a first circuit emanating from the electric panel 104 between the electric panel 104 and the load 110, and the second controller 162 is connected in line in a second circuit emanating from the electric panel 104 between the electric panel 104 and a smart load 174.

In this embodiment, the first controller 160 does not receive grid data from electric meter 105. Instead, the first controller 160 receives grid data from the power delivery system 103 via the power delivery computer 108, the power grid 106, or the communications network 107 through a one-way or two-way wired or wireless link. In one or more embodiments, the first controller 160 receives load data from the sensor 116. The sensor 116 may be a thermometer that indicates the temperature in a room or the temperature of a particular device of the load 110, e.g., an electric water heater.

The first controller 160 may be configured to cause a power regulator to regulate the power transfer between the power grid 106 and the load 110 based on the obtained grid data, the obtained load data, sensor data, and/or the data retrieved from the storage relating to a power requirement of the load 110.

The second controller 162 is shown in communication with a smart load 174 capable of providing load data that indicates its current state (e.g. temperature or state-of-charge). The second controller 162 and the smart load 174 may be in two-way communication. The second controller 162 may be configured to increase or decrease the power transfer between the power grid 106 and the smart load 174 by transmitting instructions to the smart load 174 based on at least one of obtained grid data, obtained load data (e.g. sensor data), and/or data retrieved from storage relating to a power requirement of the smart load 174. The second controller 162 may be configured to send instructions, such as a turn off or turn on order, to the smart load 174. In some embodiments, the instructions may be more nuanced than a simple turn on/turn off order such as an instruction that causes the smart load 174 to operate at an intermediate level.

Figure 4:
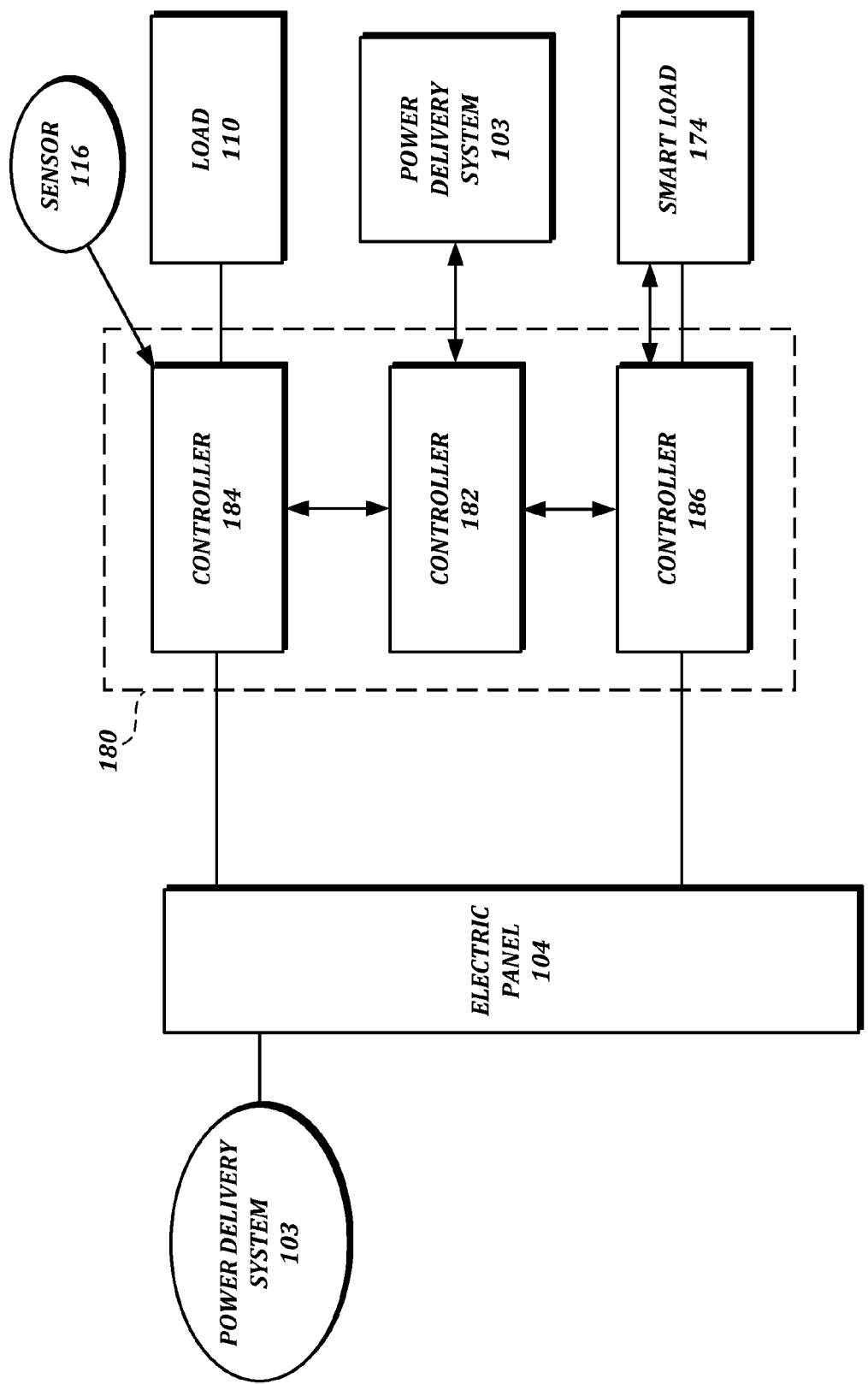
FIG. 4 is a block diagram of a control system that includes a master controller that is communicatively coupled to a plurality of controllers that are each connected in line with a different circuit having a corresponding load in accordance with one or more embodiments of the present disclosure.

FIG. 4 shows a control system 180 that includes a first controller 182, a second controller 184, and a third controller 186. Different configurations of the controller 102 may be used for each of the first controller 182, the second controller 184, or the third controller 186. In this embodiment, the second controller 184 is connected in line in a first circuit emanating from the electric panel 104 between the load 110 and the electric panel 104, and the third controller 186 is connected in line in a second circuit emanating from the electric panel 104 between the smart load 174 and the electric panel 104.

The first controller 182 is configured as a "master" controller and is communicatively coupled with the power delivery system 103 and may obtain grid data from the power delivery system 103. In one or more embodiments, the first controller 182 is "independent" of the electric meter 105 and does not necessarily communicate with the electric meter 105. The first controller 182 is configured to communicate with the second controller 184 and the third controller 186 via wired or wireless communication. The second controller 184 and the third controller 186 may communicate with the power delivery system 103 or receive grid data via the first controller 182.

The second controller 184 receives through a one-way wired or wireless link, load data from the sensor 116 that is located on the premises of a customer. The sensor 116, for example, may include a thermometer that indicates the temperature in a room or the temperature of a particular device, e.g., a water heater. The second controller 184 is configured to compare the load data to data in the storage of the second controller related to a power requirement of the load 110. For example, the data related to a power requirement of the load 110 may reflect the desired temperature at a location at or adjacent to the load 110 and may also include time or date information. Certain temperatures might be desired at certain times of day and other temperatures at other times of day.

The third controller 186 is communicatively coupled with the smart load 174. The smart load 174 may transmit load data indicating the current state of the smart load 174 (e.g., temperature or state-of-charge). The third controller 186 can send to the smart load 174 instructions based on the data related to a power requirement of the load retrieved from the storage of the third controller 186, load data, or grid data. The instructions may cause the smart load 174 to regulate the power transferred between the power delivery system 103 and the smart load 174.

Figure 5:
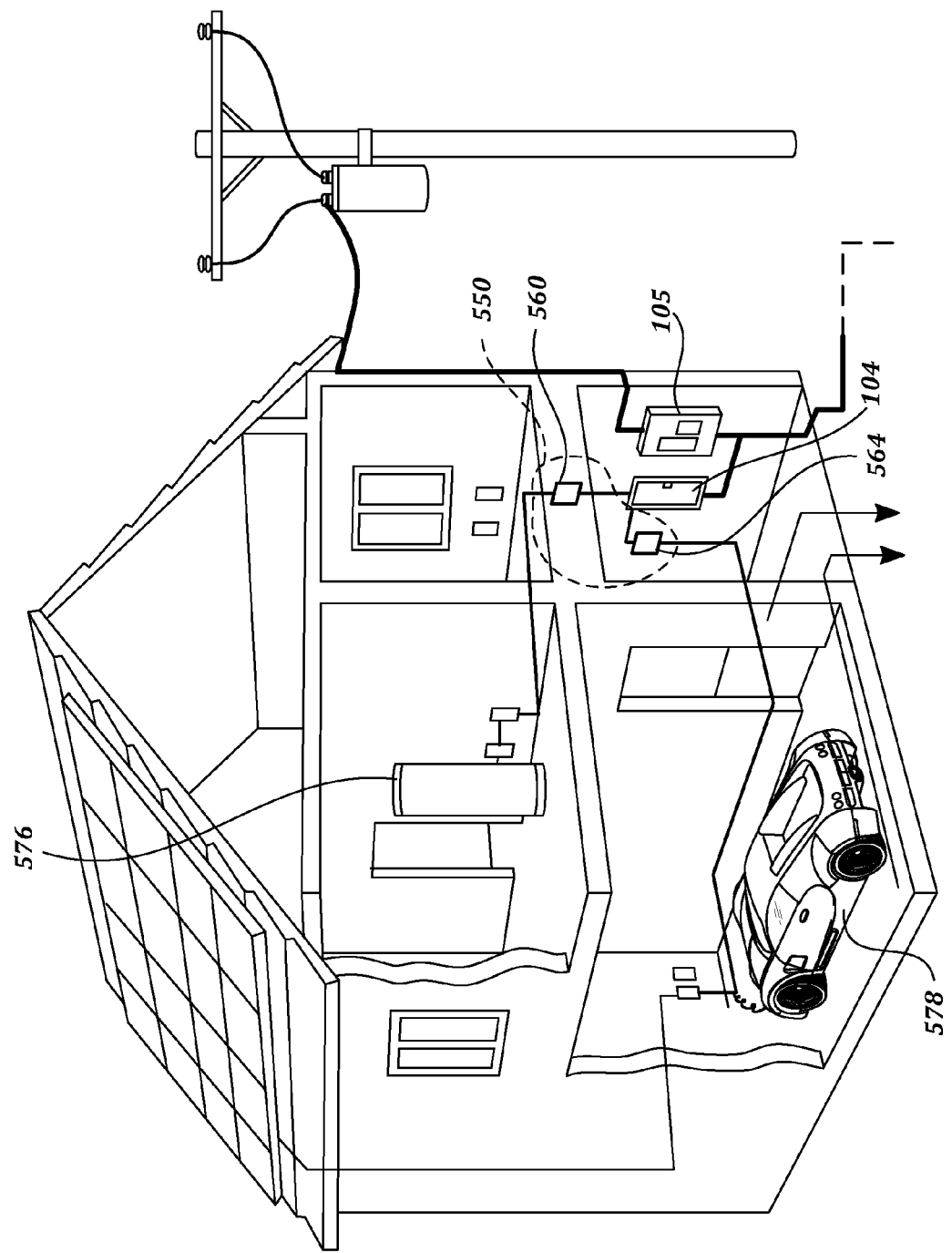
FIG. 5 is a diagram of a building that includes a controller coupled to a hot water heater and to a charger of a plug-in electric vehicle in accordance with one or more embodiments of the present disclosure.

Referring now to FIG. 5, an example of a control system 550 implemented in a building on the premises of a user of the power grid 106 is shown. The control system 550 includes a first controller 560 and a second controller 564 that are positioned close to the electric panel 104. Different configurations of the controller 102 may be used as the first controller 560 or the second controller 564. As illustrated, the first controller 560 is connected in line in a first circuit emanating from the electric panel 104 between an electric water heater 576 and the electric panel 104, and the second controller 564 is connected in line in a second circuit emanating from the electric panel between a charger of a PEV 578 and the electric panel 104. The first and second circuits emanating from the electric panel 104 may use wiring of an existing wiring system of the building.

Referring back to FIG. 1, in one or more embodiments the controller 102 may obtain grid data by direct or indirect monitoring of the power grid 106. The frequency of a power signal provided by the power grid 106 may indicate an overall load on the power grid 106. The nominal grid frequency in some locations, such as the United States, is 60 Hz. The controller 102 may obtain the current grid frequency by directly monitoring the frequency using a sensor that is within the controller 102. The sensor may be coupled anywhere power from the grid is available such as at the electric meter 105, the electric panel 104, or the power grid 106. In one or more embodiments, the controller 102 may indirectly monitor a power grid frequency by receiving power grid frequency values from the power delivery system 103. The power delivery computer 108 may transmit a measured frequency of the power grid 106 to the controller 102. If the power grid frequency is above 60 Hz, e.g., 60.4 Hz, the controller 102 may determine that an increase in the load on the power grid 106 would be beneficial to the power grid 106. If the power grid frequency is below 60 Hz, e.g., 59.6 Hz, ("a droop") the controller 102 may determine that reducing the load on the power grid 106 would be beneficial.

In one or more embodiments, the load 110 may be, for example, an electric water heater and the sensor 116 includes a temperature sensor. The sensor 116 may be placed at the electric water heater or it may be in a water tank of the electric water heater. Data related to a power requirement of the electric water heater may include a lower threshold parameter and an upper threshold parameter such that the lower threshold is greatest right before a user consumes heated water, e.g., by taking a shower. For example, for a user who works Monday through Friday from 9:00 AM to 5:00 PM, the lower threshold may be set to be relatively high between 6:30 to 8:00 on Monday through Friday when the user is most likely to use hot water for a shower. Similarly, the lower threshold may be set to be relatively low when the user is sleeping or at work and is less likely to use hot water. A similar concept may be used if the load 110 is an air conditioner. For example, a power requirement of the air conditioner may be lowest when a room serviced by the air conditioner is unoccupied and highest when occupied.

Figure 7:
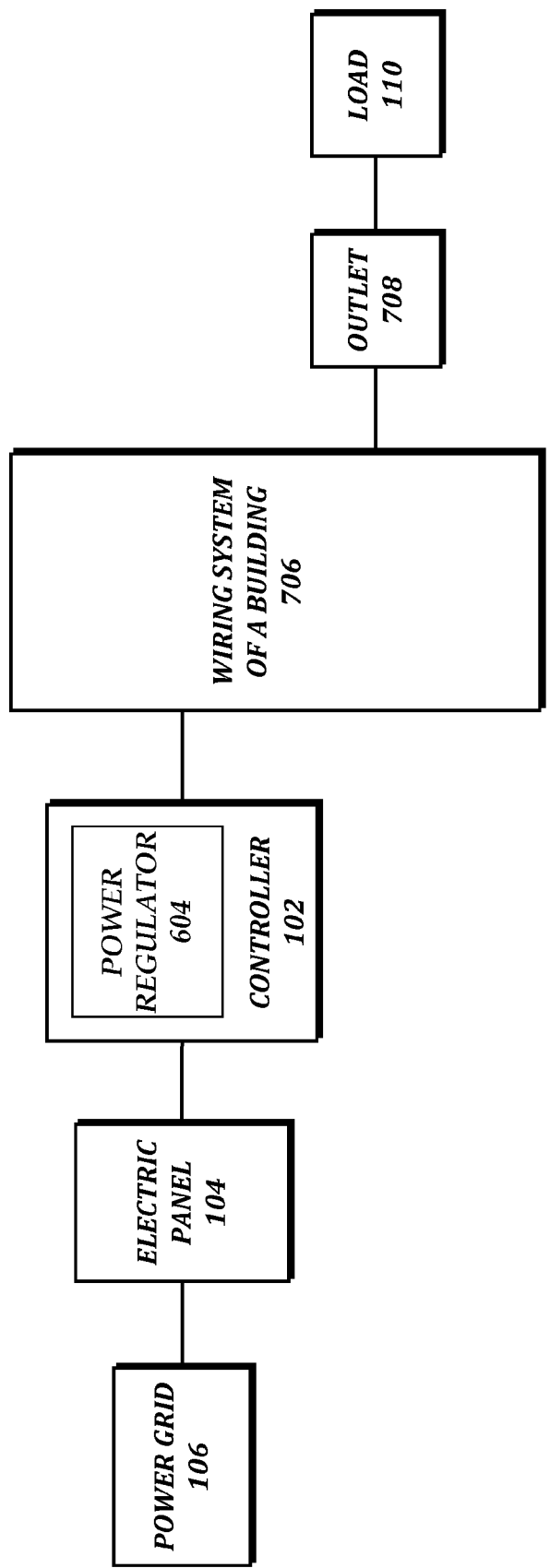
FIG. 7 is a block diagram that illustrates connection between a power grid and a first load in accordance with one or more embodiments of the present disclosure.

FIG. 7 shows a block diagram that illustrates a relative arrangement of the power grid 106, the electric panel 104, the controller 102, a wiring system of a building 706, an electric outlet 708, and a load 110. As shown, the power grid 106 is coupled to the load 110 through a circuit emanating from the electric panel 104. The electric panel 104 is followed by the controller 102, which is followed by the wiring system of the building 706. This connection order allows for the controller 102 and its power regulator 604 to be coupled near the electric panel 104, which provides for easier installation and access. The wiring system of the building 706 includes wires that pass through or within the walls of the building. This relative arrangement allows for the controller 102 and the load 110 or other loads to be coupled together through existing wiring, which can simplify the installation and operation of the controller 102. In some embodiments, the load 110 may be coupled to the power grid 106 through an electric outlet 708, followed by the wiring system of the building 706, followed by the controller 102 and the electric panel 104. The electric outlet 708 may be a general purpose power outlet and the power regulator of the controller 102 may be connected to the power outlet through the wiring system of the building 706. In one or more embodiments, the power regulator 604 is configured to be couplable to the wiring system of the building 706 such that at least the load 110 is coupled to the power grid 106 through power regulator 604 and the electric panel 104.

Figure 8:
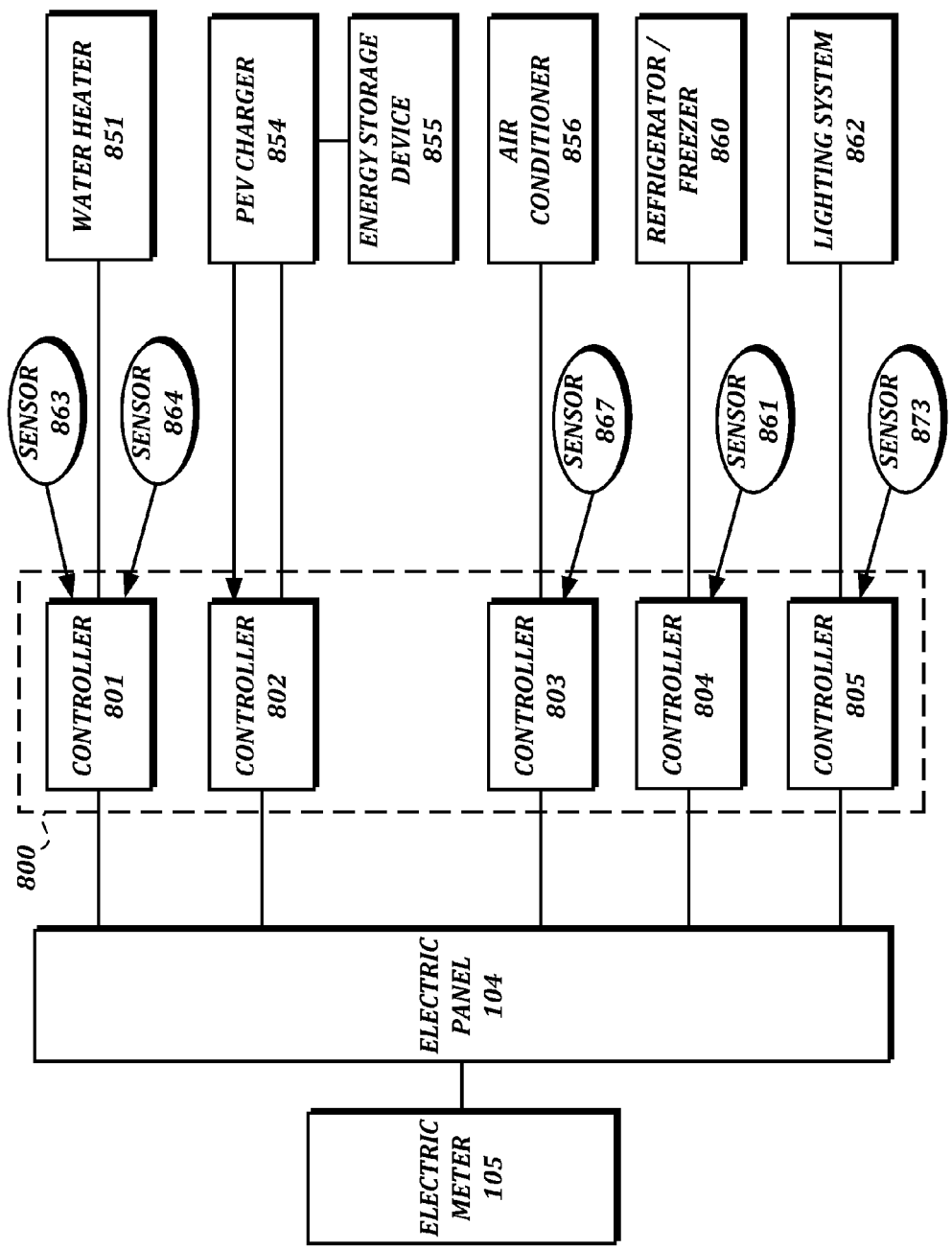
FIG. 8 is a block diagram of a control system that includes a plurality of controllers that are communicatively coupled to different sensors and control different circuits each having a corresponding electric load in accordance with one or more embodiments of the present disclosure.

FIG. 8 shows an example of a control system 800 that includes a first controller 801, a second controller 802, a third controller 803, a fourth controller 804, and a fifth controller 805. Each controller is connected in line in a different circuit that includes various loads. Each of the different circuits may emanate from the electric panel 104. The first, second, third, fourth, and/or fifth controller 801, 802, 803, 804, 805 may each use different embodiments of the controller 102, may be physically separate from one another and/or operate independently of each other, and may each communicate with the power delivery system 103 via the electric meter 105, the power delivery computer 108, the power grid 106, or the communications network 107.

The first controller 801 may be connected in line in a first circuit that includes, for example, an electric water heater 851. The first circuit may be a 220 V AC circuit. A first temperature sensor 863 may communicate water temperature for an upper part of the tank of the electric water heater 851, and a second temperature sensor 864 may communicate water temperature for the lower part of the tank of the electric water heater 851. The load data may include sensor data from the first temperature sensor 863 and the second temperature sensor 864. The first controller 801 may increase or decrease the power flowing to the electric water heater 851 based on the load data, grid data, and/or data related to a power requirement of the electric water heater 851.

In one or more embodiments, the electric water heater 851 may be a "smart" water heater with an internal capability to sense the temperatures in the upper and lower parts of the tank and to switch an upper or lower heating element on or off. In this example, the power connection between the first controller 801 and the electric water heater would not be switched using a power regulator of the first controller 801, and the first controller 801 may not include a power regulator. The internal circuitry of the electric water heater would switch the upper or lower heating elements on or off as instructed by the first controller 801. In such an embodiment, the communication link between the first controller 801 and the electric water heater 851 would be a two-way connection. Communication from the electric water heater 851 to the first controller 801 may report temperatures or other load data, and communication from the controller 801 to the water heater would provide instructions to the water heater such that internal circuitry of the electrical water heater 851 may determine whether the upper or lower elements should be turned on or off. The first controller 801 may send instructions to the electric water heater 851 to turn on or off the upper or lower elements of the electric water heater 851 based on the load data, grid data, and/or data related to a power requirement of the electric water heater 851.

The second controller 802 is shown connected in line in a second circuit that includes a PEV charger 854 that is couplable to an energy storage device 855 of a PEV. Further detail regarding the operation of the second controller 802 is discussed later herein.

The third controller 803 may be connected in line in a third circuit that includes, for example, an air conditioner 856. The third circuit may include a 110 V AC circuit. Using a one-way communication link, a room thermostat 867 reports the room's temperature to the third controller 803, and the third controller 803, considering the load data (e.g., thermostat sensor data), grid data, and/or data relating to a power requirement of the air conditioner, switches the air conditioner's power on or off.

A fourth controller 804 may be connected in line in a fourth circuit that includes, for example, a refrigerator-freezer 860. The fourth circuit may include a 110 V AC power circuit. Power may be switched on or off, based on the refrigerator's internal temperature or the freezer's internal temperature as reported via one-way communication link from the sensor 861 to the fourth controller 804.

In some embodiments, the refrigerator and freezer of the refrigerator-freezer 860 may each can turn cooling on or off in response to instructions received from the fourth controller 804. Here, two-way communications links would be used, and the fourth controller 804 would receive temperature sensor readings from the refrigerator-freezer 860 and, in turn, transmit instructions to a control device of the refrigerator-freezer 860 as to whether their cooling systems should be turned on or off. These instructions may be based on internal temperature readings of the refrigerator and freezer and grid data obtained by the fourth controller 804.

A fifth controller 805 may be connected in line in a fifth circuit that includes, for example, a 110 V AC lighting system serving one or more rooms on the premises of a user of the power grid. A sensor 873 communicates ambient lighting conditions to the fifth controller 805 via a one-way communication link, and the fifth controller 805 switches lights on or off to maintain required ambient lighting but also in consideration of the needs of the power delivery system 103. Depending on the lighting in use, the fifth controller 805 may also be capable of adjusting current flow to the lighting system as a way of adjusting the lighting output. For example, with LED lights, the light output and consequent power demand can be regulated in this way. This typically is not the case, however, with fluorescent or CFL lighting.

As mentioned above, the second controller 802 is connected in line in a second circuit that includes a PEV charger 854 that is couplable to an energy storage device 855 of a PEV. In other embodiments, energy storage devices of devices other than a PEV may be used. A battery connected to a solar panel or wind turbine may be used. The second circuit may include, for example, a 220 V AC single phase circuit. The PEV charger 854 draws power from the power grid to charge the energy storage device 855. A charging controller or control device may be included with the PEV charger 854. The PEV charger 854 may communicate load data regarding the state-of-charge of the energy storage device 855 of the PEV via a one-way communication link to the second controller 802. The second controller 802 may be configured to transmit a signal to the control device of the PEV charger 854 based at least in part on obtained grid data and data relating to a power requirement of the PEV. In one or more embodiments, the control device of the PEV charger 854 is configured to regulate the power transfer between the power grid 106 and the energy storage device 855 in response to receiving a signal from the second controller 802. In one or more embodiments, the second controller 802 may be configured to switch power to the PEV charger 854 to assure that the energy storage device 855 of the PEV reaches a threshold state of charge at a time or date while also considering the needs or requests of the power delivery system 103.

In one or more embodiments, the second controller 802 is configured to cause power stored in the energy storage device 855 to flow back into the electric panel 104 and the power grid 106 by discharging energy storage device 855. Such power flow may be triggered by the second controller 802 based on load data and grid data. Such capability would typically require that the PEV charger 854 be capable of DC-to-AC conversion (using an inverter) in addition to the usual AC-to-DC conversion needed to charge the energy storage device 855 of the PEV. The second controller 802 may be capable of allowing (or regulating) power flow in two directions. In some embodiments, the second controller 802 is configured to regulate the power flow to or from the energy storage device 855 through the PEV charger 854 to assure that the energy storage device 855 of the PEV holds a threshold state of charge at a time or date while also considering the needs or requests of the power delivery system 103. Changes to Underwriters Laboratories (UL) standards, National Electric Code (NEC) codes, and Institute of Electric and Electronics Engineers (IEEE) standards may be implemented as needed.

In one example, when grid data that includes a request to reduce load is received by the second controller 802, the PEV's state of charge is read to determine if the charge is below a threshold. If the charge is below the threshold, the second controller 802 reads its clock to determine the time of day. If the time of day allows excess time to bring the energy storage device 855 up to the state of charge set point by the time the PEV is needed, then power to the PEV charger 854 is turned off or the power flowing to the energy storage device 855 is reduced. If the request to reduce load is later rescinded, power to the PEV charger 854 is turned on and full power is restored. The second controller 802 may monitor the time of day so power to the PEV charger 854 can be brought to its full level as needed to assure that the that PEV maintains a desired relative level of charge.

In another example, when grid data that includes a request for power to be provided to the grid is received by the second controller 802, the PEV's state of charge is read to determine if the charge is above a threshold. If the charge is above a threshold, the second controller 802 reads its clock to determine the time of day. If the time of day allows excess time to obtain a threshold level of charge by the time of day, the second controller 802 enables power to flow from the energy storage device 855 of the PEV to the power grid 106. If the second controller 802 subsequently determines that a state of charge of the energy storage device 855 is below a threshold energy requirement, the second controller 802 may disable power flow from the energy storage device 855. The user may receive a credit for the power provided to the power grid 106.

In yet another example, referring to FIG. 1 where the load 110 is an electric water heater, the controller 102 may be configured to, in response to receiving grid data including a request to reduce load, obtain load data that includes the temperature of the load 110. If the temperature is below a threshold temperature for the electric water heater, the controller 102 reads its clock to determine the time of day. If the time of day allows excess time to bring the electric water heater up to the temperature threshold by the time hot water is needed, then power to the water heater is turned off or the power flowing to water heater is reduced. If a load shed signal from the power delivery system 103 is later rescinded, power to the water heater is turned on and full power is restored. Time of day continues to be monitored so power to the water heater can be brought to its full level as needed to assure that various levels of hot water are maintained.

The controllers disclosed here are generally located external to the devices of the loads. It in one or more embodiments, the functionality of the controller 102 may be built into a device of the load 110. It is anticipated that, as smart grid concepts are widely implemented, this will be the case. An external controller of the type described herein should be particularly useful during the transition to the smart grid.

It should be understood that using the disjunctive term "or," herein and throughout the claims that follow, is intended to mean "and/or," having both conjunctive and disjunctive meanings (and is not confined to an "exclusive or" meaning), unless otherwise indicated. As used in the description herein and throughout the claims that follow, "a," "an," and "the" include plural references unless the context clearly dictates otherwise. Also as used in the description herein and throughout the claims that follow, the meaning of "in" includes "in" and "on" unless the context clearly dictates otherwise.

While illustrative embodiments have been illustrated and described, it will be appreciated that various changes can be made therein without departing from the spirit and scope of the invention.

The invention claimed is:

1. A system for controlling power transfer between a power grid and at least one load at premises of a user of the power grid, the system comprising:
 a first controller that includes a storage and a first power regulator that is configured to be couplable between a first load and an electric panel that is coupled to the power grid,
 wherein the storage contains data relating to one or more power requirements of the first load, and
 wherein the first controller is configured to:
  obtain grid data relating to a dynamic characteristic of the power grid; and
  cause the power regulator to regulate the power transfer between the power grid and the first load based at least in part on the obtained grid data and data retrieved from the storage of the first controller relating to a power requirement of the first load, and
 wherein the first controller is further configured to obtain load data relating to a dynamic characteristic of the first load and/or the surroundings of the first load, and cause the first power regulator to regulate the power transfer between the power grid and the first load based on the obtained grid data, the obtained load data, and the data retrieved from the storage of the first controller,
 the system further comprising:
 a second controller that includes a storage and a power regulator that is configured to be couplable between a second load and the electric panel,
 wherein the storage of the second controller contains data relating to one or more power requirements of the second load, and
 wherein the second controller is configured to:
  obtain grid data relating to a dynamic characteristic of the power grid;

obtain load data relating to a dynamic characteristic of the second load; and cause the power regulator of the second controller to regulate the power transfer between the power grid and the second load based at least in part on the obtained grid data, the obtained load data, and data retrieved from the storage of the second controller relating to a power requirement of the second load, wherein the first controller is further configured to transmit data to a power delivery system of the power grid based on one or more of the obtained grid data, the obtained load data relating to a dynamic characteristic of the second load, and data retrieved from the storage of the second controller relating to a power requirement of the second load.

2. The system of claim 1, wherein the second controller is further configured to obtain grid data relating to a dynamic characteristic of the power grid that has been modified based on the data transmitted to the power delivery system of the power grid by the first controller.

3. The system of claim 1, wherein the data transmitted to the power delivery system of the power grid by the first load is indicative of a current or future increase or decrease in power transfer between the power grid and the first load.

* * * * *